May 27, 1958 — I. F. GILLIATT — 2,836,284

LIVE ROLL CONVEYOR

Filed April 29, 1955 — 2 Sheets-Sheet 1

INVENTOR.
IRA F. GILLIATT
BY Martin Kilpatrick
Atty

May 27, 1958     I. F. GILLIATT     2,836,284
LIVE ROLL CONVEYOR
Filed April 29, 1955     2 Sheets-Sheet 2
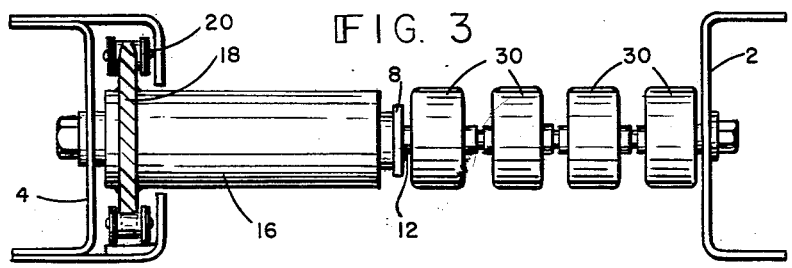
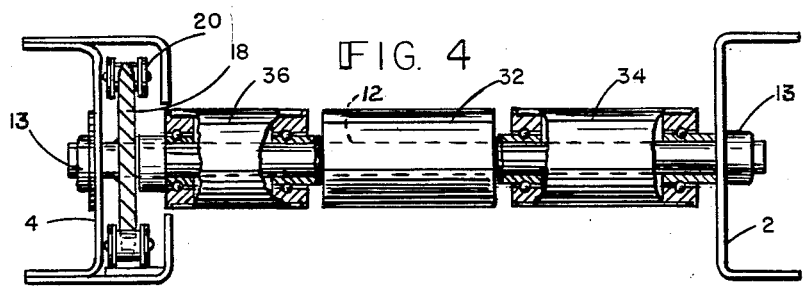
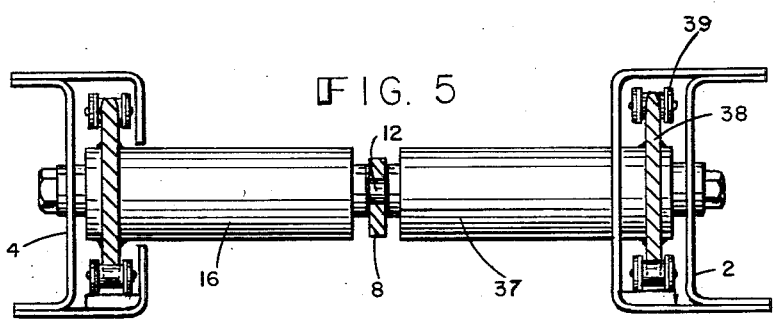
*INVENTOR.*
IRA F. GILLIATT 2,836,284
Patented May 27, 1958

2,836,284

LIVE ROLL CONVEYOR

Ira F. Gilliatt, Milton, Mass., assignor to Conveyor Specialty Company, Inc., a corporation of Massachusetts Application April 29, 1955, Serial No. 504,870

9 Claims. (Cl. 198—127)

This invention relates to roller conveyors and more particularly to conveyors having a bend therein for transporting around a bend articles having at least one relatively flat side.

In roller conveyors generally used for transporting articles around a bend there is a tendency for the objects being conveyed to creep sideways off center and twist as they travel over the rollers, and this is true whether the rollers be power driven as in flat conveyors or be idler rollers as in gravity conveyors. Various expedients have been resorted to in order to solve these problems, but the most satisfactory solution heretofore known, that is, power driven rollers extending across the conveyor and having a tapered cross section of predetermined dimensions to provide a uniform angular speed across the width of the conveyor, are both inflexible as to various applications and far too expensive for the majority of uses.

Accordingly, it is an object of the present invention to provide a novel roller conveyor having a bend therein which will keep the objects being conveyed around said bend on the center line of the conveyor and without twisting so that they will leave the conveyor alined therewith.

Further objects and features of the invention will become apparent from the following description of preferred embodiments of my invention, together with the accompanying drawings wherein:

Fig. 3 is an elevational view showing a modified form of the conveyor of Figs. 1 and 2.

Fig. 4 is an elevational view, partly broken away, showing another modified form of the conveyor of Figs. 1 and 2; and Fig. 5 is an elevational view showing still another modified form of the conveyor of Figs. 1 and 2.

Figure 1:
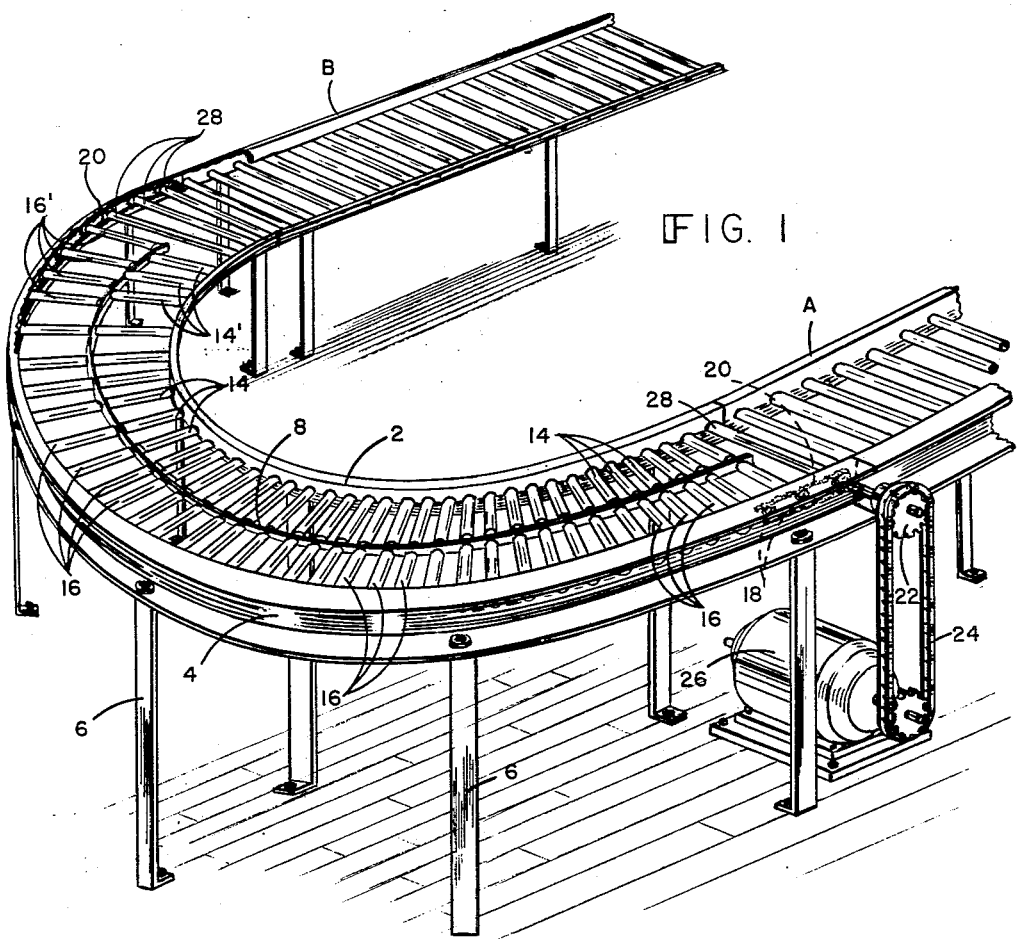
Fig. 1 is an isometric view of the roller conveyor of the invention.
Figure 2:
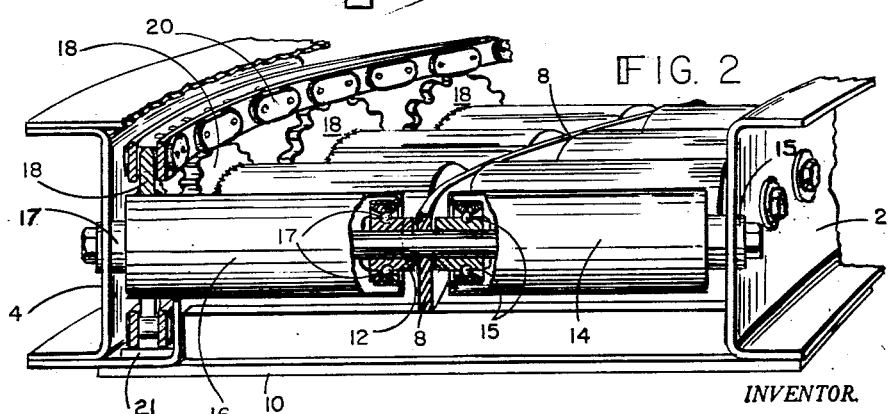
Fig. 2 is an enlarged isometric view, partially broken away, of a portion of the conveyor of Fig. 1.

Referring to Figs. 1 and 2, a framework having a semicircular bend therein for connecting two straight conveyors A and B having, for example, parallel rollers, is provided for supporting the rollers of the curved conveyor. Such framework comprises a pair of side rails, inner side rail 2 and outer side rail 4, with legs 6 supporting them at a suitable height from the floor. A central support rail 8 may extend centrally of the conveyor between the side rails, said central support rail being mounted on a plurality of cross members 10 extending from the inner to the outer side rail. A plurality of roll supporting shafts 12 are mounted in said side rails 2, 4 and said central support rail 8, with the axes of said shafts extending generally in a horizontal plane and radially of said framework. A plurality of cylindrical rollers are rotatably mounted on said shafts for conveying articles around the bend in the conveyor, said rollers in general being in two groups, an inner group of idler rolls 14 rotatably supported by ball bearings 15 on shafts 12 adjacent the inner rail 2 between central support rail 8 and said inner rail 2, and an outer group of driven rollers 16 rotatably supported by ball bearings 17 on said shafts 12 adjacent the outer side rail 4 between support rail 8 and said outer rail. The outer rollers 16 are thus positioned radially outwardly from the inner rollers 14 and the upper surfaces of both the inner and outer rollers are generally tangential to a common horizontal plane.

For rotating said outer rollers 16, a sprocket 18 is provided on each of said rollers at their outer ends, and an endless chain 20 is passed around all of said sprockets for driving them in synchronism, the lower flight of said chain being supported in engagement with the sprockets 18 by a member 21 on the inside lower flange of outer rail 4. A roller 16 at one end of the conveyor has an extension with a sprocket 22 thereon for driving all of the driven rollers 16 through a suitable chain drive 24 from a motor 26.

Preferably, positively driven rollers 28 extending entirely across the conveyor are provided at the input and output ends of the conveyor. Thus, a single long driven roller 28 is provided at the input end of the conveyor adjacent the straight input conveyor A, and three such rollers are provided at the output end of the conveyor adjacent the straight output conveyor B to aid in swinging an article onto and from the curved conveyor of the invention. Also, driven rollers 16 and idler rollers 14 need not be on a common shaft, but may be on shafts extending but half way across the conveyor so that they may be staggered if such is desired for any reason, as shown in Fig. 1, rolls 16' and 14'.

In operation, then, the outer rollers 16 are rotated by motor 26 to drive an article around the bend in the conveyor, the article itself rotating the idler rollers 14 at a rotational and peripheral speed different from that of the driven rollers so that the article passes around the bend on the center line thereof and without twisting so that it will leave the curved conveyor alined with straight conveyor B. For accommodating articles of different types, motor 26 is preferably arranged to drive outer rollers 16 at any desired speed.

In Fig. 3 is shown a modification of the structure of Figs. 1 and 2 wherein a plurality of idler wheels 30 are substituted for each of the idler rolls 14. Such wheels themselves are well known in this art and, for example, comprise ball bearing mounted wheels of the type similar to those commonly used on roller skates.

In Fig. 4 is shown another modification wherein three rollers are mounted on each shaft 12, the central supporting rail being omitted in this embodiment. In this arrangement, the central roller 32 is mounted fixedly on shaft 12 which shaft is rotatably mounted in side rails 2 and 4 by bearings 13, and is rotated by shaft sprocket 18. Idler rolls are mounted on each side of driven roller 32, an inner idler roller 34 and an outer idler roller 36 arranged inwardly and outwardly of central roller 32 respectively.

In Fig. 5 is shown still another modification wherein two driven rollers are mounted on a shaft 12, outer driven roller 16 as above described, and inner driven roller 37. The latter roller is rotatably mounted on shaft 12 by suitable bearings and is driven through its sprockets 38 by a chain 39 at a rotational and peripheral speed less than that of outer roller 16. A suitable motor drive not shown but similar to that of Fig. 1 is employed to drive said inner chain. Thus, by varying the relative speeds of outer rollers 16 and inner rollers 37, a high degree of control may be provided.

Thus it will be seen that the invention has provided a novel flat conveyor for conveying around a bend articles having at least one flat surface while maintaining them substantially on the center line of the curved conveyor without twisting. Various other modifications of the invention not herein described but within the spirit of the invention and the scope of the appended claims will occur to those skilled in this art.

I claim:

1. A flat conveyor for objects having a flat surface comprising a roll supporting framework having a bend therein and a plurality of cylindrical rollers mounted on the bend of said framework with their axes arranged generally radially of said bend and their upper surfaces generally tangential to a common horizontal plane, said rollers including inner and outer groups of rollers, said inner group being mounted on said framework radially inwardly of said outer group, and said outer group being mounted on said framework radially outwardly of said inner group and means for driving one of said groups at a rotational speed different from the other of said groups.

2. A conveyor as claimed in claim 1 wherein said outer group only is driven.

3. A conveyor as claimed in claim 1 wherein said outer group is driven at a first speed and said inner group is driven at a second speed less than said first speed.

4. A flat conveyor for objects having a flat surface comprising a roll supporting framework having a bend therein and including inner and outer curved side rails, a plurality of shafts mounted on said side rails and extending therebetween radially of said bend, a plurality of cylindrical rollers mounted on each of said shafts, including an outer roller and an inner roller spaced radially inwardly thereof with the upper surfaces of said outer and inner rollers generally tangential to a common horizontal plane, and means for driving said outer rollers at a rotational speed different from that of said inner rollers including a sprocket arranged to drive each of said outer rollers, an endless chain for driving all of said sprockets, and power means for driving said endless chain.

5. A conveyor as claimed in claim 4 wherein power means are provided for driving said inner rollers including a sprocket arranged to drive each of said inner rollers, an endless chain for driving all of said sprockets, and power means for driving said endless chain.

6. A conveyor as claimed in claim 4 wherein an idler roller is mounted on said shaft outwardly of said outer driven roller.

7. A conveyor as claimed in claim 4 further including a central rail supporting said shafts centrally thereof, said outer roller being positioned outwardly thereof and said inner roller positioned inwardly thereof.

8. A conveyor as claimed in claim 4 further including power driven rollers extending from said inner to said outer rails at the input and output ends of said conveyor.

9. A flat conveyor for objects having a flat surface comprising a roll supporting framework having a bend therein, said framework including inner and outer curved side rails and supporting legs therefor, a plurality of radially extending shafts supported generally in a horizontal plane on and extending between said side rails, each of said shafts having rotatably mounted thereon an outer power driven cylindrical roll adjacent said outer rail and an inner idler cylindrical roll positioned radially inwardly thereof with the upper surfaces of said rollers generally tangential to a common horizontal plane, and means for driving said driven rollers including a sprocket mounted on said driven rollers for driving each of said rollers, an endless chain for driving said sprockets, and power means for driving said endless chain, whereby articles will be moved around the bend in said conveyor in the center line thereof.

References Cited in the file of this patent

UNITED STATES PATENTS

| 1,827,886 | Gillespie | Oct. 20, 1931 |
| 2,622,720 | Lorig | Dec. 23, 1952 |

FOREIGN PATENTS

| 140,506 | Australia | Mar. 21, 1951 |